(12) United States Patent
Allen et al.

(10) Patent No.: US 9,455,611 B2
(45) Date of Patent: Sep. 27, 2016

(54) PROCESS FOR ASSEMBLING A STATOR CORE ASSEMBLY

(71) Applicant: Siemens Energy, Inc., Orlando, FL (US)

(72) Inventors: David Thomas Allen, Longwood, FL (US); Victor A. Siegel, Jr., Tega Cay, SC (US)

(73) Assignee: SIEMENS ENERGY, INC., Orlando, FL (US)

(*) Notice: Subject to any disclaimer, the term of this patent is extended or adjusted under 35 U.S.C. 154(b) by 38 days.

(21) Appl. No.: 14/168,046

(22) Filed: Jan. 30, 2014

(65) Prior Publication Data

US 2014/0144008 A1    May 29, 2014

Related U.S. Application Data

(62) Division of application No. 13/170,226, filed on Jun. 28, 2011, now Pat. No. 8,643,246.

(51) Int. Cl.
| | |
|---|---|
| *H02K 15/02* | (2006.01) |
| *H02K 1/16* | (2006.01) |
| *H02K 1/18* | (2006.01) |
| *H02K 1/14* | (2006.01) |

(52) U.S. Cl.
CPC ............... *H02K 15/02* (2013.01); *H02K 1/16* (2013.01); *H02K 1/18* (2013.01); *H02K 1/148* (2013.01); *Y10T 29/49009* (2015.01)

(58) Field of Classification Search
CPC .................................. H02K 1/16; H02K 1/18
USPC ............ 29/596–598, 732, 736; 310/216.029, 310/11, 129
See application file for complete search history.

(56) References Cited

U.S. PATENT DOCUMENTS

| | | | | |
|---|---|---|---|---|
| 4,290,291 | A * | 9/1981 | Burns | 72/316 |
| 4,306,168 | A * | 12/1981 | Peachee | 310/400 |
| 4,854,034 | A * | 8/1989 | Archibald et al. | 29/596 |
| 5,051,642 | A * | 9/1991 | Hediger et al. | 310/260 |
| 6,448,686 | B1 * | 9/2002 | Dawson et al. | 310/216.051 |
| 6,796,021 | B2 * | 9/2004 | Fuller | 29/732 |
| 7,397,163 | B2 * | 7/2008 | Cook et al. | 310/216.051 |
| 2008/0086868 | A1 * | 4/2008 | Holmes et al. | 29/596 |
| 2013/0002087 | A1 * | 1/2013 | Allen et al. | 310/216.129 |

FOREIGN PATENT DOCUMENTS

| | | |
|---|---|---|
| JP | 57138830 A | 8/1982 |
| JP | 2003153495 A | 5/2003 |

* cited by examiner

*Primary Examiner* — Minh Trinh

(57) ABSTRACT

The present invention comprises a process for assembling a stator core assembly to replace existing stator cores in electric power generators. First and second stator core modules are positioned adjacent to one another such that one end of a fastener assembly in the second stator core module is nested in a counter-bore of the first stator core module and one end of a fastener assembly in the first stator core is nested in a counter-bore of the second stator core module.

6 Claims, 3 Drawing Sheets

US 9,455,611 B2

PROCESS FOR ASSEMBLING A STATOR CORE ASSEMBLY

CROSS REFERENCE TO RELATED APPLICATIONS

The present application is a divisional application of U.S. patent application Ser. No. 13/170,226, filed Jun. 28, 2011, the entire contents of which are incorporated by reference.

FIELD OF THE INVENTION

This invention relates in general to a stator core module, a stator core assembly comprising a plurality of stator core modules and a process for assembling a stator core assembly.

BACKGROUND OF THE INVENTION

Stator core modules have been used in the past to successfully replace existing hand-stacked generator stator core systems. U.S. Pat. No. 5,875,540 to Sargeant et al., which is incorporated herein by reference, discloses a stator core assembly process comprising forming a series of stator core modules from stator core rings using a vacuum pressure impregnation bonding process. The prefabricated modules are then assembled into a stator core.

One known method for forming stator core modules involves first forming via a global vacuum pressure impregnation process (GVPI) a 70"-80" long core section that is further processed by sectioning into 6" lengths so as to define 6" long stator core modules. The modules are then shipped to the field for assembly. Replacement stator core sections that utilize the GVPI system require reassembly of the sectioned stator core modules in the same order from which they were extracted from the corresponding 70"-80" section to maintain the continuity between surface interfaces and reduce the introduction of gaps and voids if the original sectioned surfaces are not realigned to their original state. If one 6" module is lost due to processing/handling in the field, then it would be necessary to return to traditional hand-stacking techniques in the field to replace the 6" module, which is not a practical means of replacement due to schedule time constraints.

SUMMARY OF THE INVENTION

In accordance with a first aspect of the present invention, a stator core module is provided comprising a main body including a plurality of core rings. The main body may comprise first and second outer surfaces, a first through-hole located at a first location of the main body; a first counter-bore aligned with the first through-hole and extending to the main body first outer surface; a second through-hole located at a second location of the main body; and a second counter-bore aligned with the second through-hole and extending to the main body second outer surface. The main body may further comprise a first fastener assembly having first and second opposing ends and a second fastener assembly. The first fastener assembly may extend through the first through-hole such that the first assembly first end extends beyond the main body second outer surface and the second end is positioned below the main body first outer surface. The second fastener assembly extends through the second through-hole in the main body.

The second fastener assembly may comprise third and fourth opposing ends and may extend through the second through-hole such that the second assembly third end extends beyond the main body first outer surface and the second assembly fourth end is positioned below the main body second outer surface.

The first fastener assembly may comprise a threaded epoxy glass rod having first and second ends defining the first fastener assembly first and second ends. The first fastener assembly may additionally include a first epoxy glass nut located at the glass rod first end, a second epoxy glass nut located at the glass rod second end, a first epoxy glass Belleville washer located at the glass rod first end and a second epoxy glass Belleville washer located at the glass rod second end. The first fastener assembly second end is located within the first counter-bore.

The stator core module main body may comprise a plurality of core rings. Preferably, a vacuum pressure impregnation bonding or other adhesive bonding process is not used to couple the core rings together.

In accordance with a second aspect of the present invention, a stator core assembly is provided comprising a first stator core module and a second stator core module. The first stator core module may comprise a first main body comprising a plurality of first core rings, first and second outer surfaces, first and second through-holes, first and second counter-bores aligned respectfully with the first and second through-holes, a first fastener assembly having first and second opposing ends and a second fastener assembly having third and fourth opposing ends. The first and second fastener assemblies may extend respectfully through the first and second through-holes. A second stator core module may comprise a second main body comprising a plurality of second core rings, third and fourth outer surfaces, third and fourth through-holes, third and fourth counter-bores aligned respectively with the third and fourth through-holes, a third fastener assembly having fifth and sixth opposing ends and a fourth fastener assembly having seventh and eighth opposing ends. The third and fourth fastener assemblies may extend respectfully through the third and fourth through-holes. The first and second stator core modules may be aligned such that the fifth end of the third fastener assembly is nested in the first counter-bore in the first main body.

The first counter-bore may extend to the first outer surface of the first main body and the second counter-bore may extend to the second outer surface of the first main body.

The first end of the first fastener assembly may extend above the second outer surface of the first main body and the second end of the first fastener assembly may be positioned in the first counter-bore in the first main body.

The fifth end of the third fastener assembly may extend beyond the fourth outer surface of the second main body and the sixth end of the second fastener assembly may be positioned below the third outer surface of the second main body.

The third end of the second fastener assembly may extend beyond the first outer surface of the first main body and the fourth end of the second fastener may be positioned in the second counter-bore in the first main body.

The second main body may further comprise a fourth through-hole and a fourth counter-bore aligned with the fourth through-hole and extending to the fourth outer surface of the second main body. The third end of the second fastener assembly may extend into the fourth counter-bore of the second main body.

In accordance with a third aspect of the present invention, a process is provided for assembling a stator core assembly comprising providing first and second stator core modules each having a protruding fastener assembly; positioning the first stator core module adjacent the second stator core module such that the protruding fastener assembly on the first stator core module nests in a counter-bore provided in the second stator core module; and coupling the first and second stator core modules to one another.

The positioning may result in the protruding fastener assembly on the second stator core module nesting within a counter-bore provided in the first stator core module.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
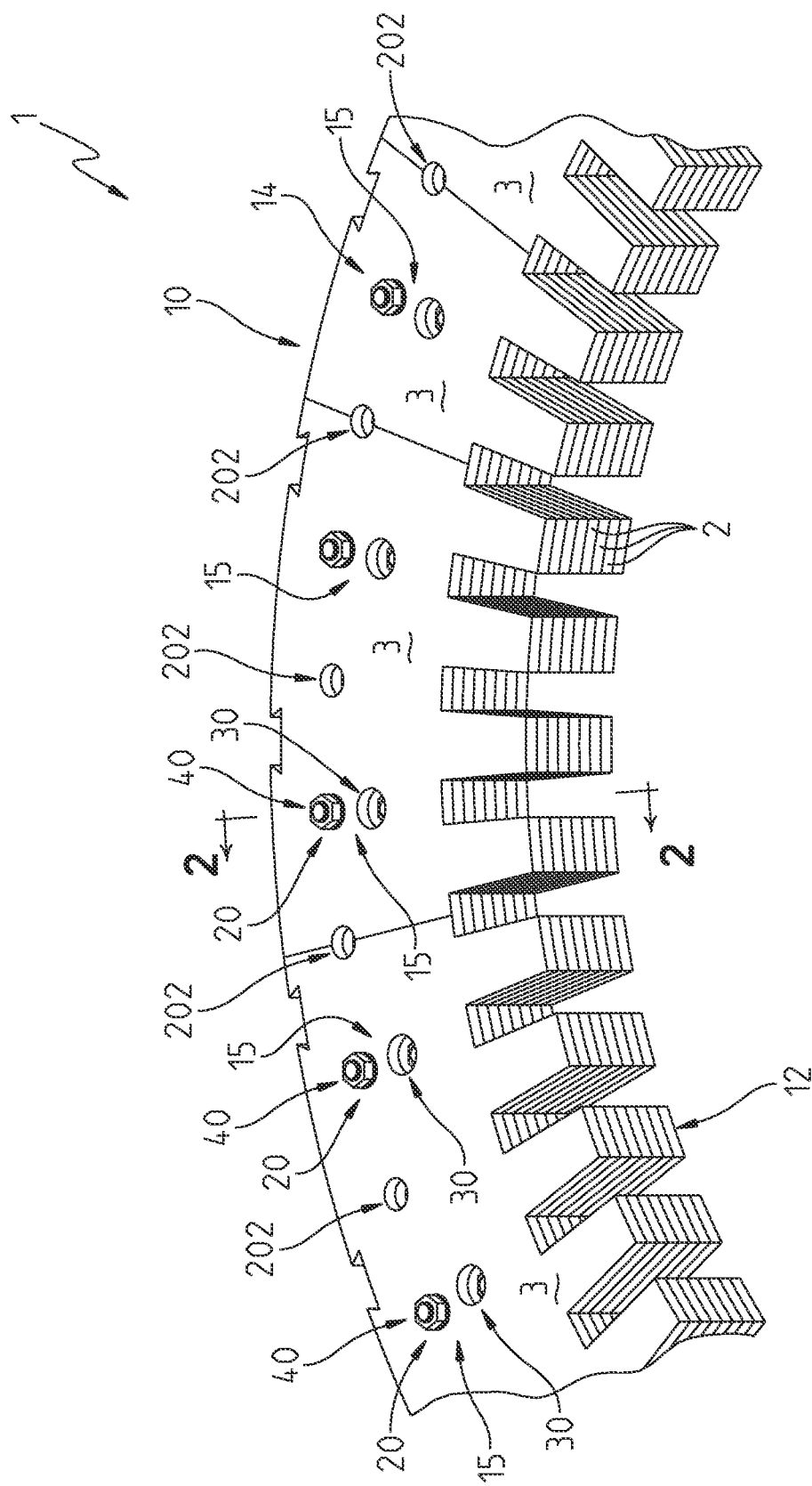
FIG. 1 is a perspective view of a stator core module according to one aspect of the present invention.
Figure 2:
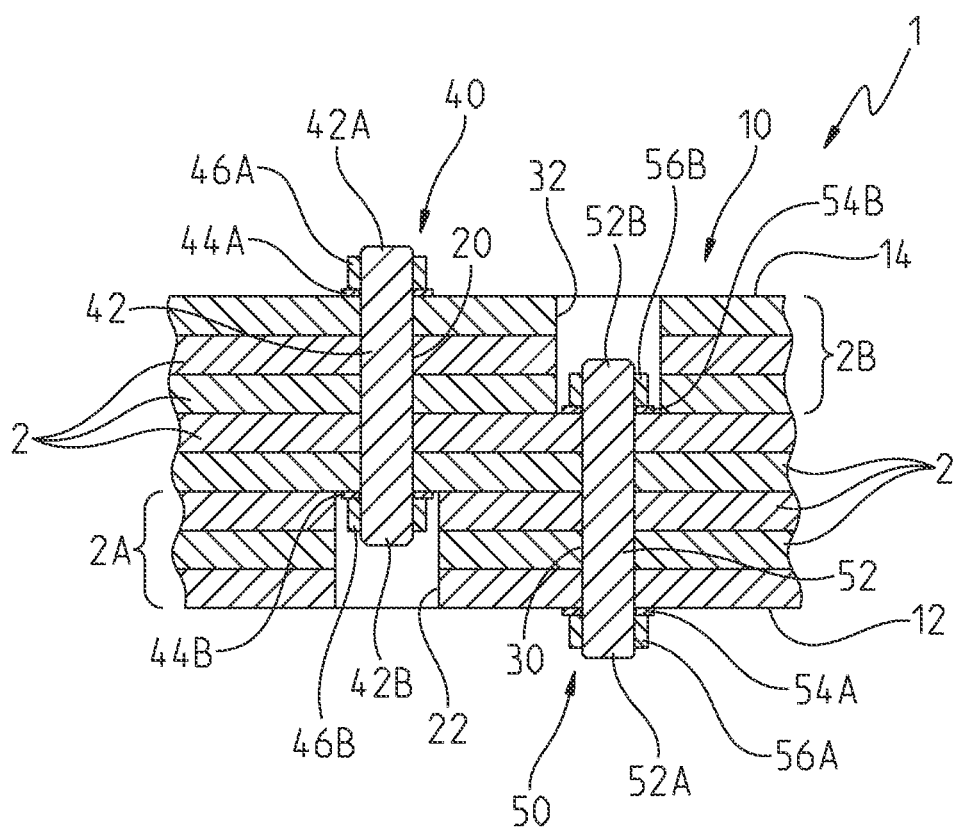
FIG. 2 is an enlarged cross-sectional view taken along section line 2-2 in FIG. 1.

Reference is now made to FIGS. 1 and 2, which shows a multi-layered stator core module 1 according to the present invention. The stator core module 1 comprises, in the illustrated embodiment, a plurality of individual core rings 2, which are stacked and aligned to define a main body 10 having first and second outer surfaces 12 and 14, respectfully. Each core ring 2 is formed from a circumferential arrangement of stamped plates 3 of ferrous metal, such as plate steel. For example, nine plates 3 may be arranged and welded together so as to form a single core ring 2. However, any number of plates 3 can be shaped, arranged and coupled together using any known method to create a single core ring 2 of any desired diameter. Each core ring 2 constitutes a single lamination layer in the multi-layered stator core module 1. An example thickness for each core ring 2 may equal about 0.018 inch. Each core ring 2 aligns with the remaining core rings 2 of the stator core module 1. If a stator core module 1 has a length of 6 inches, then it comprises approximately 333 core rings 2. The number of core rings 2 illustrated for each stator core module in FIGS. 1-3 has been reduced for ease of illustration and the thicknesses of those core rings 2 have not been drawn to scale.

The stator core module 1 comprises a plurality of pairs 15 of first and second through-holes 20 and 30, see FIG. 1. The first and second through-holes 20 and 30 of each pair 15 are generally radially spaced apart from another. Further, the pairs 15 of through-holes 20 and 30 are spaced apart circumferentially about the main body 10. A pair 15 of first and second through-holes 20 and 30 is preferably provided for each axially aligned set of plates 3, wherein each axially aligned set of plates 3 is defined by a plate 3 from each core ring 2, which plates 3 are axially aligned with one another.

Hence, if the rings 2 are each formed from nine plates 3, then at least nine pairs 15 of first and second through-holes 20 and 30 may be provided in the main body 10.

Each first through-hole 20 includes a corresponding first counter-bore 22, which is aligned with the first through-hole 20 and extends to the main body first outer surface 12, see FIG. 2. Each second through-hole 30 includes a corresponding second counter-bore 32, which is aligned with the second through-hole 30 and extends to the main body second outer surface 14.

In the illustrated embodiment, a first fastener assembly 40 is provided for each first through-hole 20 and a second fastener assembly 50 is provided for each second through-hole 30, see FIG. 2. The first and second fastener assemblies 40 and 50 are generally parallel with a central axis of the stator core module 1.

Each first fastener assembly 40 comprises a first epoxy glass rod 42 having opposing first and second threaded ends 42A and 42B, respectfully; first and second epoxy glass Belleville washers 44A and 44B, respectfully; and first and second epoxy glass nuts 46A and 46B, respectfully. Each first glass rod 42 is positioned in a corresponding first through-hole 20. A corresponding first Belleville washer 44A is mounted over the first end 42A of the glass rod 42 and then a first nut 46A is threaded onto the first end 42A. A corresponding second Belleville washer 44B is mounted over the second end 42B of the glass rod 42 and a second nut 46B is threaded onto the second end 42B. The first and second nuts 46A and 46B are tightened such that core rings 2 located between the first and second Belleville washers 44A and 44B are clamped together. As is illustrated in FIG. 2, the first end 42A of the first glass rod 42 extends beyond the main body second outer surface 14, while the second end 42B of the first glad rod 42 is positioned below the main body first outer surface 12 in a corresponding first counter bore 22.

Each second fastener assembly 50 comprises a second epoxy glass rod 52 having opposing third and fourth threaded ends 52A and 52B, respectfully; third and fourth epoxy glass Belleville washers 54A and 54B, respectfully; and third and fourth epoxy glass nuts 56A and 56B, respectfully, see FIG. 2. Each second glass rod 52 is positioned in a corresponding second through-hole 30. A corresponding third Belleville washer 54A is mounted over the third end 52A of the glass rod 52 and then a third nut 56A is threaded onto the third end 52A. A corresponding fourth Belleville washer 54B is mounted over the fourth end 52B of the glass rod 52 and a fourth nut 56B is threaded onto the fourth end 52B. The third and fourth nuts 56A and 56B are tightened such that core rings 2 located between the third and fourth Belleville washers 54A and 54B are clamped together. As is illustrated in FIG. 2, the third end 52A of the second glass rod 52 extends beyond the main body first outer surface 12, while the fourth end 52B of the second glass rod 52 is positioned below the main body second outer surface 14 in a corresponding second counter bore 32.

As is apparent from FIG. 2, a first set 2A of core rings 2 near the main body first outer surface 12 are not clamped by the first fastener assemblies 40, but are clamped by the second fastener assemblies 50. Further, a second set 2B of core rings 2 near the main body second outer surface 14 are not clamped by the second fastener assemblies 50, but are clamped by the first fastener assemblies 40. The first, second, third and fourth nuts 46A, 46B, 56A and 56B are tightened to a predetermined value to provide sufficient friction between the core rings 2 to consolidate the stator core module length without the use of vacuum pressure impregnation bonding, i.e., use of an adhesive/resin bonding process is not required to couple together the core rings 2. Additionally, this clamping will leave the outer edges of the stator core module 1 more compliant than a resin-bonded stator core module allowing for accommodation of variations in surface flatness when assembling adjacent stator core modules 1 to form a stator core module assembly.

Figure 3:
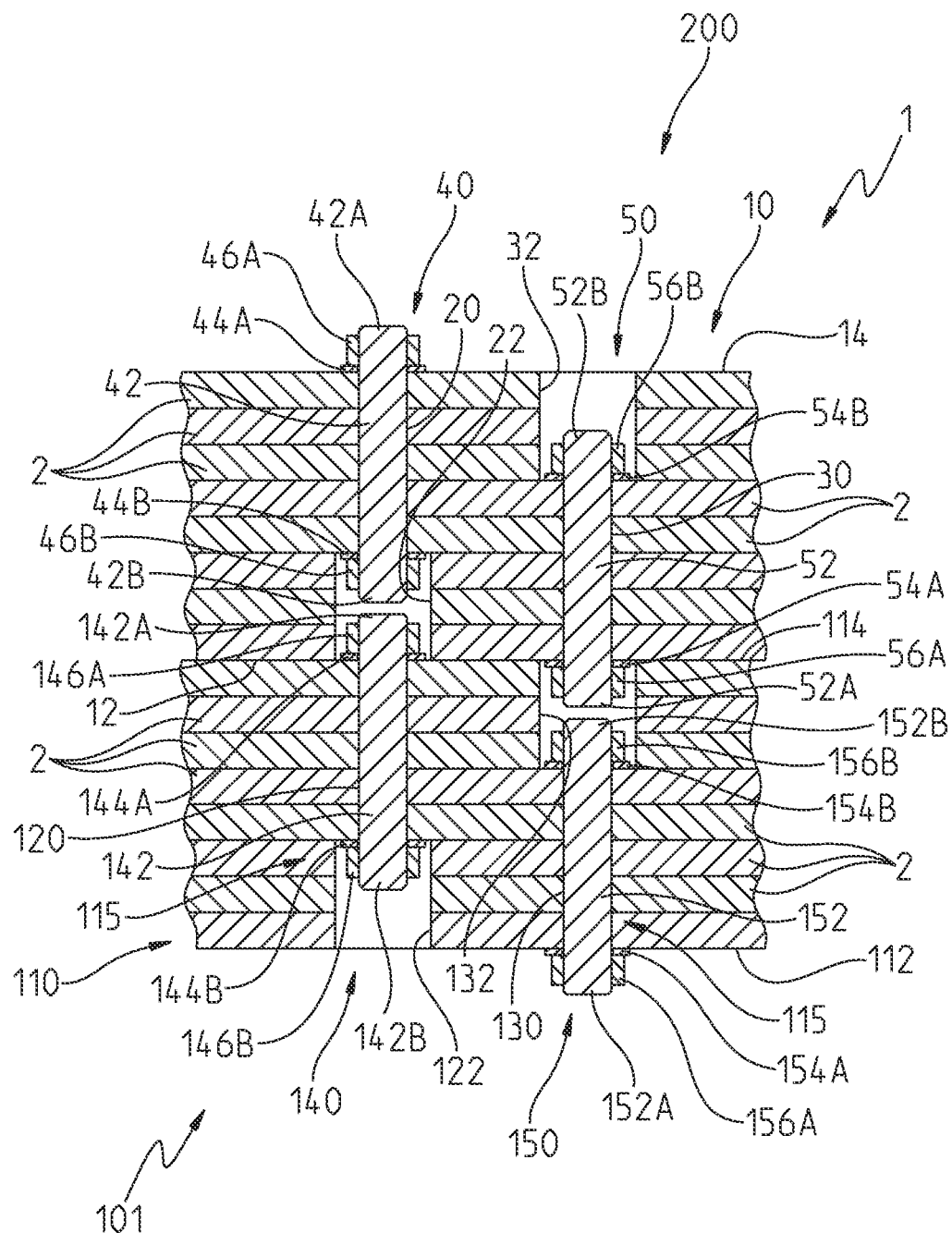
FIG. 3 is a cross-sectional view illustrating two stacked stator core modules.

In accordance with the present invention, a stator core module assembly 200 is formed from a plurality of stacked stator core modules. The stator core assembly 200 may be assembled within a horizontally disposed power generator stator frame (not shown), see U.S. Pat. No. 7,397,163, the entire disclosure of which is incorporated herein by reference. In FIG. 3, a first stator core module 1 and a second stator core module 101 are illustrated in a stacked relation, wherein the components of the first module 1 are the same as those making up the stator core module 1 in FIGS. 1 and 2 and, hence, are referenced by the same reference numerals. While not illustrated in FIG. 3, additional stator core modules are provided to form the stator core assembly 200. For example, if each stator core module has an axial length of six inches and a standard stator core module assembly has an axial length of 200 inches, approximately 33 stator core modules would be stacked or positioned adjacent to one another to form the stator core module assembly. After the stator core modules are stacked within the stator frame, through bolts (not shown), made of high strength steel, are installed through openings 202 in each of the stacked stator core modules, see FIG. 1, so as to extend completely through each stator core module. Nuts (not shown) are coupled onto opposing threaded ends of the through bolts, which extend generally the entire length of the stator core assembly 200, so as to couple the plurality of stator core modules together to define the stator core assembly 200.

The second stator core module 101 in FIG. 3 comprises a second main body 110 comprising a plurality of core rings 2. The second main body 110 comprises third and fourth outer surfaces 112 and 114, a plurality of pairs 115 of third and fourth through-holes 120 and 130, respectively, and third and fourth counter-bores 122 and 132, respectively, aligned with the third and fourth through-holes 120 and 130. The third and fourth through-holes 120 and 130 of each pair 115 are generally radially spaced apart from another. Further, the pairs 115 of through-holes 120 and 130 are spaced apart circumferentially about the second main body 110.

A third fastener assembly 140 is provided for each third through-hole 120 and a fourth fastener assembly 150 is provided for each fourth through-hole 130, see FIG. 3. The third and fourth fastener assemblies 140 and 150 are generally parallel with a central axis of the second stator core module 101.

Each third fastener assembly 140 comprises a third epoxy glass rod 142 having opposing fifth and sixth threaded ends 142A and 142B, respectfully; fifth and sixth epoxy glass Belleville washers 144A and 144B, respectfully; and fifth and sixth epoxy glass nuts 146A and 146B, respectfully. Each third glass rod 142 is positioned in a corresponding third through-hole 120. A corresponding fifth Belleville washer 144A is mounted over the fifth end 142A of the glass rod 142 and then a fifth nut 146A is threaded onto the fifth end 142A. A corresponding sixth Belleville washer 144B is mounted over the sixth end 142B of the glass rod 142 and a sixth nut 146B is threaded onto the sixth end 142B. The fifth and sixth nuts 146A and 146B are tightened such that core rings 2 located between the fifth and sixth Belleville washers 144A and 144B are clamped together. As is illustrated in FIG. 3, the fifth end 142A of the third glass rod 142 extends beyond the second main body fourth outer surface 114, while the sixth end 142B of the third glass rod 142 is positioned below the second main body third outer surface 112 in a corresponding third counter bore 122.

Each fourth fastener assembly 150 comprises a fourth epoxy glass rod 152 having opposing seventh and eighth threaded ends 152A and 152B, respectfully; seventh and eighth epoxy glass Belleville washers 154A and 154B, respectfully; and seventh and eighth epoxy glass nuts 156A and 156B, respectfully, see FIG. 3. Each fourth glass rod 152 is positioned in a corresponding fourth through-hole 130. A corresponding seventh Belleville washer 154A is mounted over the seventh end 152A of the glass rod 152 and then a seventh nut 156A is threaded onto the seventh end 152A. A corresponding eighth Belleville washer 154B is mounted over the eighth end 152B of the glass rod 152 and an eighth nut 156B is threaded onto the eighth end 152B. The seventh and eighth nuts 156A and 156B are tightened such that core rings 2 located between the seventh and eighth Belleville washers 154A and 154B are clamped together. As is illustrated in FIG. 3, the seventh end 152A of the fourth glass rod 152 extends beyond the main body third outer surface 112, while the eighth end 152B of the fourth glass rod 152 is positioned below the main body fourth outer surface 114 in a corresponding fourth counter bore 132.

The depth of each counter bore 22, 32, 122 and 132 is approximately equal to the sum of the height of two nuts (e.g., each nut may have a height=0.625 inch), two Belleville washers (e.g., each Belleville washer may have a height=0.12 inch), 2×(one glass rod thread past a nut, e.g., 0.12 inch), and a clearance distance, e.g., 0.12 inch, between the two adjacent glass rod ends.

Depth of counter bore=[[0.625+0.12+0.12]'2+0.12]

The first and second stator core modules 1 and 101 are aligned such that the fifth end 142A of the third fastener assembly glass rod 142 is nested in the first counter-bore 22 in the first stator core module main body 10 and spaced a small clearance distance, e.g., 0.12 inch, from the second end 42B of the first fastener assembly glass rod 42. Likewise, the third end 52A of the second fastener assembly glass rod 52 is nested in the fourth counter-bore 132 in the second stator core module main body 110 and spaced a small clearance distance, e.g., 0.12 inch, from the eighth end 152B of the fourth fastener assembly glass rod 152. In this manner, the first outer surface 12 of the first stator core module main body 10 may contact the fourth outer surface 114 of the second stator core module main body 110 without the first and third fastener assemblies 40 and 140 contacting one another or the second and fourth fastener assemblies 50 and 150 contacting one another.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for assembling a stator core assembly comprising:
   providing first and second stator core modules;
   wherein said first stator core module comprises a first main body comprising a plurality of first core rings, first and second through-holes in said first main body, first and second counter-bores aligned with said first and second through-holes, respectively, and first and second fastener assemblies extending through said first and second through-holes, respectively; and said second stator core module comprises a second main body comprising a plurality of second core rings, a third through-hole in said second main body, a third counter-bore, and a third fastener assembly extending through said third through-hole, wherein said third fastener defines a protruding fastener assembly on said second stator core module;

positioning said first stator core module adjacent said second stator core module such that said protruding fastener assembly on said second stator core module nests in said first counter-bore provided in said first stator core module; and coupling said first and second stator core modules to one another.

2. The process as set out in claim 1, wherein said first stator core module comprises a first main body comprising a plurality of first core rings which are not coupled together via vacuum pressure impregnation.

3. The process as set out in claim 1, wherein said first stator core module comprises a first main body comprising a plurality of first core rings which are not coupled together via adhesive bonding.

4. The process as set out in claim 1, wherein said second main body of said second stator core module further comprises a fourth through-hole, a fourth counter-bore aligned with said fourth through-hole, and a fourth fastener assembly extending through said fourth through-hole.

5. The process as set out in claim 4, wherein said second fastener assembly defines a protruding fastener assembly on said first stator core module and positioning said first stator core module adjacent said second stator core module includes said protruding fastener assembly on said first stator core module nesting in said fourth counter-bore provided in said second stator core module.

6. The process as set out in claim 1, wherein said first and second stator core modules each include at least one through opening, and coupling said first and second stator core modules to one another comprises positioning a bolt through said through openings of said first and second stator core modules.

* * * * *